(12) United States Patent
Katz

(10) Patent No.: US 10,955,085 B2
(45) Date of Patent: Mar. 23, 2021

(54) HINGED CLAMP AND STAND ELEMENT BUILDING BLOCKS

(71) Applicant: Yehoshua Katz, Brooklyn, NY (US)

(72) Inventor: Yehoshua Katz, Brooklyn, NY (US)

( * ) Notice: Subject to any disclaimer, the term of this patent is extended or adjusted under 35 U.S.C. 154(b) by 0 days.

(21) Appl. No.: 16/777,124

(22) Filed: Jan. 30, 2020

(65) Prior Publication Data

US 2020/0166176 A1 May 28, 2020

Related U.S. Application Data

(62) Division of application No. 15/982,651, filed on May 17, 2018, now Pat. No. 10,612,721.

(60) Provisional application No. 62/630,014, filed on Feb. 13, 2018.

(51) Int. Cl.

| *F16M 11/38* | (2006.01) |
|---|---|
| *F16B 5/00* | (2006.01) |
| *G09F 15/00* | (2006.01) |
| *E04B 1/344* | (2006.01) |
| *E04B 1/12* | (2006.01) |
| *E05D 3/04* | (2006.01) |
| *E05D 11/10* | (2006.01) |

(52) U.S. Cl.
CPC ............ *F16M 11/38* (2013.01); *E04B 1/344* (2013.01); *F16B 5/0088* (2013.01); *G09F 15/0068* (2013.01); *E04B 1/12* (2013.01); *E05D 3/04* (2013.01); *E05D 11/1007* (2013.01); *E05Y 2201/70* (2013.01); *E05Y 2900/10* (2013.01); *F16M 2200/022* (2013.01)

(58) Field of Classification Search
CPC ............ F16M 11/38; F16M 2200/022; F16M 2200/024; F16B 5/0088; E04B 1/344; E04B 1/12; E05D 2003/025; E05D 3/02; E05D 2011/1035; E05D 11/1028; E05D 11/1007; E05D 3/04; E05Y 2900/10; E05Y 2201/70; G09F 15/0068
See application file for complete search history.

(56) References Cited

U.S. PATENT DOCUMENTS

| 54,171 A | 4/1866 | Jordan, Sr. |
|---|---|---|
| 154,949 A | 9/1874 | Hall |
| 220,965 A | 10/1879 | Decombe |
| 261,150 A | 7/1882 | Gowen |
| 536,125 A | 3/1895 | Brown |
| 540,645 A | 6/1895 | Deming |

(Continued)

FOREIGN PATENT DOCUMENTS

| AU | 5301690 | 10/1990 |
|---|---|---|
| CH | 144795 A | 1/1931 |

(Continued)

*Primary Examiner* — Christopher Garft
(74) *Attorney, Agent, or Firm* — Norton Rose Fulbright US LLP; Aaron Grunberger

(57) ABSTRACT

A building block includes a plurality of panel elements that are each rotatable relative to each other one of the plurality of panel elements; a connecting pin that passes through and rotatably connects the plurality of panel elements to each other; and a plurality of connectors, each connector rotatably attached to a respective panel element, where each one of the panel elements includes at least on locking feature configured to create a releasably fixed connection between adjacent panel elements.

10 Claims, 16 Drawing Sheets

(56) References Cited

U.S. PATENT DOCUMENTS

| | | | |
|---|---|---|---|
| 540,646 A | 6/1895 | Deming | |
| 655,596 A | 8/1900 | Baden | |
| 820,995 A | 5/1906 | Smith | |
| 951,327 A | 3/1910 | Meyer | |
| 1,596,470 A * | 8/1926 | Way | E05D 3/02 |
| | | | 16/242 |
| 1,643,592 A | 9/1927 | Soss | |
| 2,048,380 A * | 7/1936 | Hansen | E05D 7/009 |
| | | | 16/387 |
| 2,400,608 A | 5/1946 | Shearer | |
| 2,584,111 A | 2/1952 | Brenner et al. | |
| 3,528,668 A | 9/1970 | Barton | |
| 4,464,073 A * | 8/1984 | Cherry | E04B 1/1903 |
| | | | 16/365 |
| 4,918,786 A * | 4/1990 | Perry | B64C 9/02 |
| | | | 16/365 |
| 5,448,799 A | 9/1995 | Stein, Jr. | |
| D372,415 S | 8/1996 | Guidotti | |
| D372,852 S | 8/1996 | Noll et al. | |
| 5,682,646 A * | 11/1997 | Tyler, IV | E05D 5/062 |
| | | | 16/264 |
| D557,586 S | 12/2007 | Shire et al. | |
| 7,665,187 B1 * | 2/2010 | Elowsky | E05D 5/04 |
| | | | 16/390 |
| 2004/0216271 A1 * | 11/2004 | Schott | E05D 5/0238 |
| | | | 16/234 |
| 2005/0263661 A1 * | 12/2005 | Park | A42B 1/247 |
| | | | 248/292.12 |
| 2008/0141495 A1 | 6/2008 | Fisher | |
| 2015/0048656 A1 | 2/2015 | McCullough | |

FOREIGN PATENT DOCUMENTS

| | | |
|---|---|---|
| DE | 735209 C | 5/1943 |
| EP | 0099972 B1 | 2/1986 |
| EP | 1297866 | 4/2003 |
| GB | 2156425 A | 10/1985 |
| JP | H09184347 A | 7/1997 |
| WO | 2007043084 A1 | 4/2007 |

* cited by examiner

HINGED CLAMP AND STAND ELEMENT BUILDING BLOCKS

CROSS-REFERENCE TO RELATED APPLICATION

The present application is a divisional application of U.S. patent application Ser. No. 15/982,651, filed May 17, 2018, and claims the benefit under 35 U.S.C. § 119(e), of U.S. Provisional Patent Application Ser. No. 62/630,014, filed on Feb. 13, 2018, both of which are expressly incorporated herein by reference in their entirety.

FIELD OF INVENTION

The present disclosure relates generally to building blocks having a plurality of elements hinged together, where the building blocks can releasably connect to each other at multiple edges and at multiple angles to form connecting elements between others of the blocks, to form support bases for a structure composed of the blocks, and to form clamps for clamping an item such as a board between respective pairs of the hinged elements.

BACKGROUND

A building block generally refers to a standardized component of a construction set. When used together with other building blocks of the same construction set, a wide variety of models, structures, or other physical objects can be created. Building blocks associated with the same construction set typically have standard features that enable the building blocks to be easily connected and/or disconnected from each other. Additionally, the standard features of the building blocks of a construction set can reduce the cost of manufacturing the construction set. Standard features of a construction set of building blocks can include, for example, struts, panels, and/or connection nodes.

SUMMARY

An example embodiment of the present invention relates to a building block, the building block including a plurality of panel elements, each panel element being rotatable relative to each other one of the plurality of panel elements; a connecting pin that passes through and rotatably connects each one of the plurality of panel elements to each other; and a plurality of connectors that are each rotatably attached to a respective one of the panel elements. In an example embodiment, each one of the panel elements includes at least one locking feature configured to fix a rotational position of adjacent ones of the panel elements relative to each other.

In an example embodiment, each connector of a first building block includes at least one connecting projection and/or connecting notch configured to mechanically connect the first building block to a second building block, e.g., that is structured like the first building block. For example, in an example embodiment, the at least one connecting projection is positioned orthogonally to the at least one connecting notch.

In an example embodiment, the locking features of adjacent panel elements are configured as a first detent, the first detent allowing rotation of the adjacent panel elements at discrete positions with respect to each other.

According to an example embodiment, the building block includes a first panel element, a second panel element, a third panel element, and a fourth panel element. For example, the first panel element includes a first locking feature; the second panel element includes a first locking feature and a second locking feature; the third panel element includes a first locking feature; and the fourth panel element includes a first locking feature and a second locking feature. For example, the first locking feature of the first panel element contacts the first locking feature of the fourth panel element; the second locking feature of the fourth panel element contacts the first locking feature of the second panel element; and the second locking element of the second panel contacts the first locking feature of the third panel element.

In an example embodiment, each connector includes a connector body, a top projection, and a bottom projection, where the top projection and the bottom projection are configured to rotatably connect the connector to a respective panel element. In an example embodiment, the top projection and the bottom projection each includes a first projection element, a second projection element, and a third projection element, wherein the first, second, and third projection elements project outwardly from the connector body.

In an example embodiment, each panel element includes a top shoulder and a bottom shoulder, where the top shoulder and bottom shoulder of each panel element are configured to connect the panel element to a respective connector.

In an example embodiment, the top shoulder and bottom shoulder of each panel element includes a respective top connector socket and bottom connector socket, where the top connector socket and the bottom connector socket include a plurality of ridges.

In an example embodiment, the first, second, and third projection elements and the plurality of ridges of the top connector socket or the bottom connector socket are configured as a second detent, the second detent allowing rotation of the connector at discrete positions with respect to a respective panel element. For example, the at least one locking feature is formed as a series of ridges and valleys on the at least one panel element.

For example, each panel element includes a top pin socket and a bottom pin socket, the top pin socket and the bottom pin socket configured to receive the connecting pin.

According to an example embodiment, the building block further includes a connecting nut that is releasably attachable to the connecting pin, wherein the connecting nut is configured to secure the plurality of panel elements into fixed positions by tightening the locking features of the panels against each other while they are arranged around the connecting pin.

In an example embodiment, each one of the plurality of panel elements include a top connecting notch and a bottom connecting notch, the top and bottom connecting notches configured to mechanically connect the building block with a further building block.

Example embodiments of the present invention relate to a method of using a plurality of building blocks, the method comprising positioning a first building block adjacent to a second building block; and applying a force to the first building block to mechanically connect the first building block to the second building block. For example, each building block includes a plurality of panel elements, each panel element being rotatable relative to each other one of the plurality of panel elements; a connecting pin that passes through and rotatably connects each one of the plurality of panel elements to each other; and a plurality of connectors, each connector rotatably attached to a respective panel element, where each one of the panel elements includes at least one locking feature configured to create a fixed connection between adjacent panel elements.

In an example embodiment, each of the connectors includes at least one connecting projection, and at least one connecting notch, where the at least one connecting notch is configured to mechanically connect the first building block with at least one connecting projection of the second building block.

For example, each one of the plurality of panel elements includes a top connecting notch and a bottom connecting notch, the top and bottom connecting notches configured to mechanically connect the first building block to other building blocks.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features, and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

The drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1A:
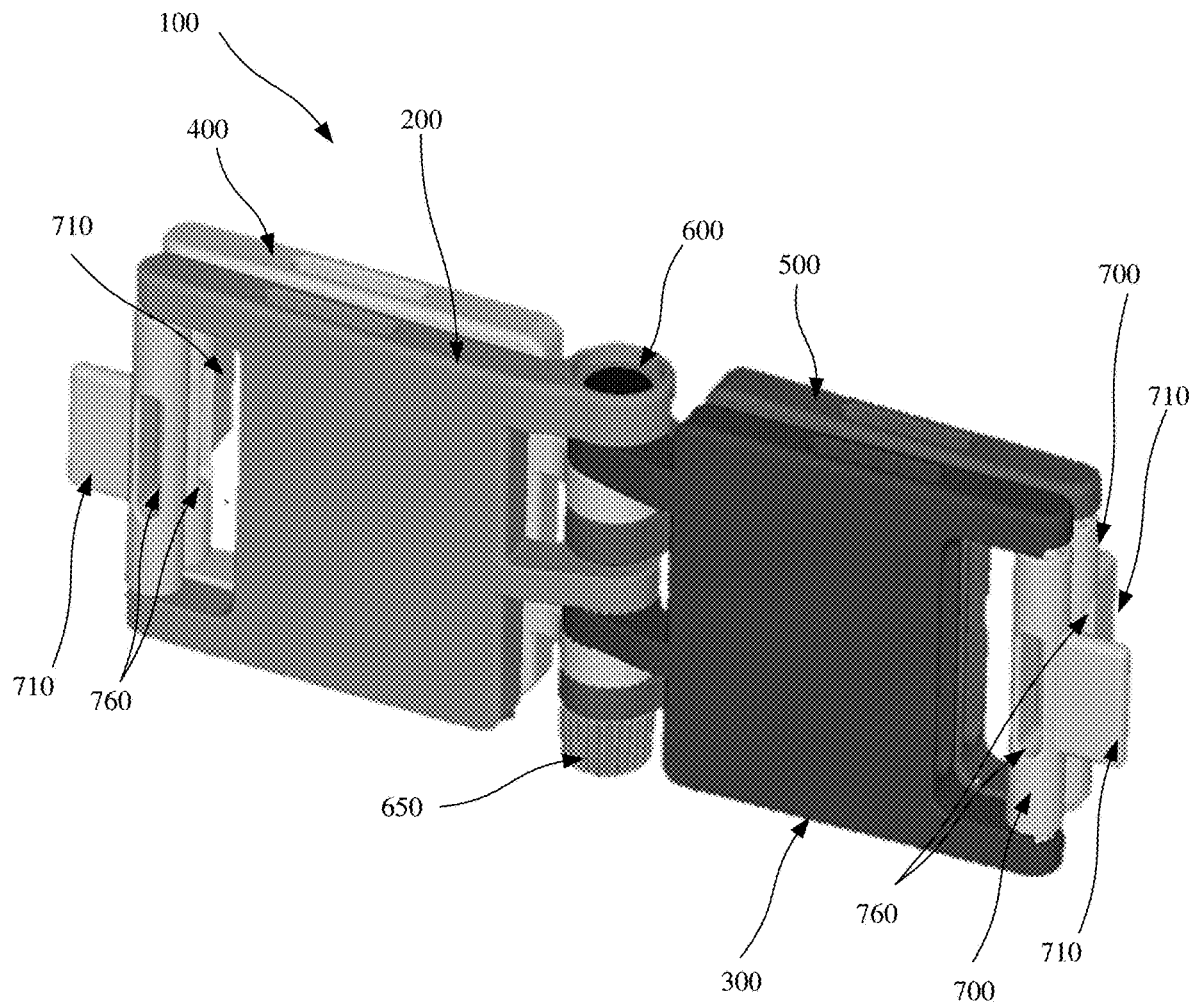
FIG. 1A is a perspective view of an example building block according to an example embodiment of the present invention.

FIG. 1A illustrates an example building block 100 in a first position. Building block 100 includes panel elements 200, 300, 400, and 500; connecting pin 600; and connectors 700. The panel elements 200, 300, 400, and 500 can each be connected to each other one of the panels by connecting pin 600, about which panel elements 200, 300, 400, and 500 can be rotated relative to each other. Connecting nut 650 can be releasably attached to one end of connecting pin 600. Each connector 700 can include at least one connecting projection 710 and at least one connecting notch 760.

Figure 1B:
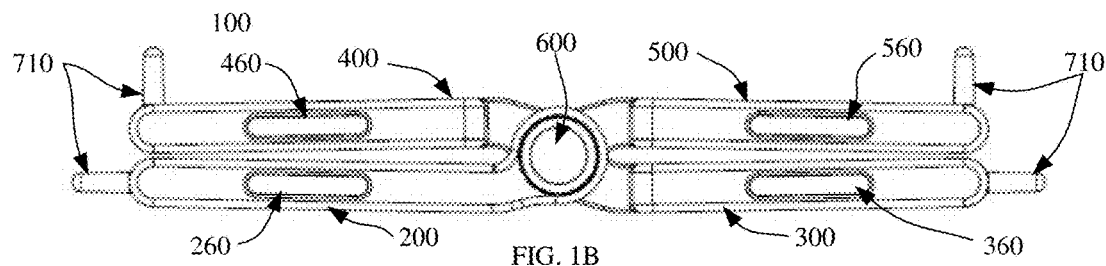
FIG. 1B is a schematic top view of the example building block according to an example embodiment of the present invention.
Figure 15:
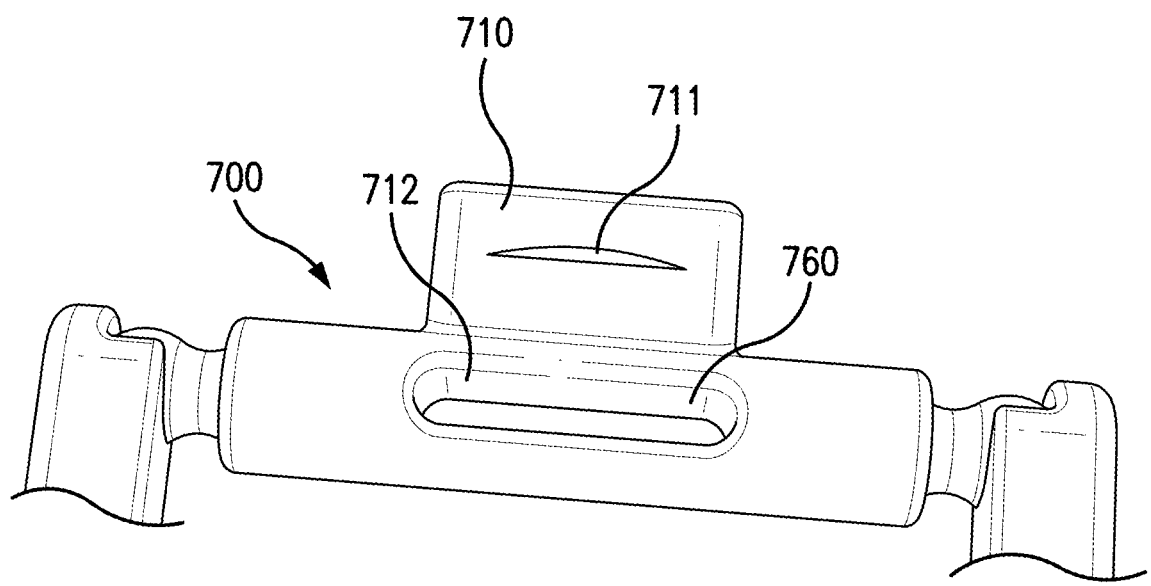
FIG. 15 illustrates a connecting element with a protrusion for interlocking with a notch according to an example embodiment of the present invention.

FIG. 1B is a schematic top view of building block 100 in the first position. In the first position, panel element 200 contacts panel element 400, and panel element 300 contacts panel element 500. Each panel element 200, 300, 400, and 500 can have a respective top connecting notch 260, 360, 460, and 560 as shown. As shown in FIG. 1B, connecting projections 710 can be rotated to, and between, a position that is perpendicular to a planar surface of the respective panel element to which the connecting projection 710 is connected and a position that is parallel to the planar surface of the respective panel element to which the connecting projection 710 is connected. In an example, the connecting projection 710 is shaped form fittingly for insertion into notches 260, 360, 460, and 560 mentioned above and/or to notches 760 described below and/or to notches 261, 361, 461, and 561 described below, for example for a friction fit connection thereto, to thereby connect different panel elements of the same or different building blocks to each other. In example embodiment the connecting element 710 includes a protrusion 711 as shown in FIG. 15, e.g., longitudinally extending parallel to a longitudinal extension of a central longitudinal axis of connector 700, and one or more of notches 760, 261, 361, 461, and 561 includes an interiorly protruding ring (or bar(s)), e.g., ring 712 shown in notch 760 in FIG. 15, that releasably lock with each other for holding the connecting projection 710 in the notch into which it is inserted until a user applies a strong enough force, that is greater than the locking force, pulling the connecting projection 710 out of the notch. In an example embodiment one of the elements 711 and 712 (or other similar element of another notch) is a projection and the other is a groove for receiving the projection.

Figure 1C:
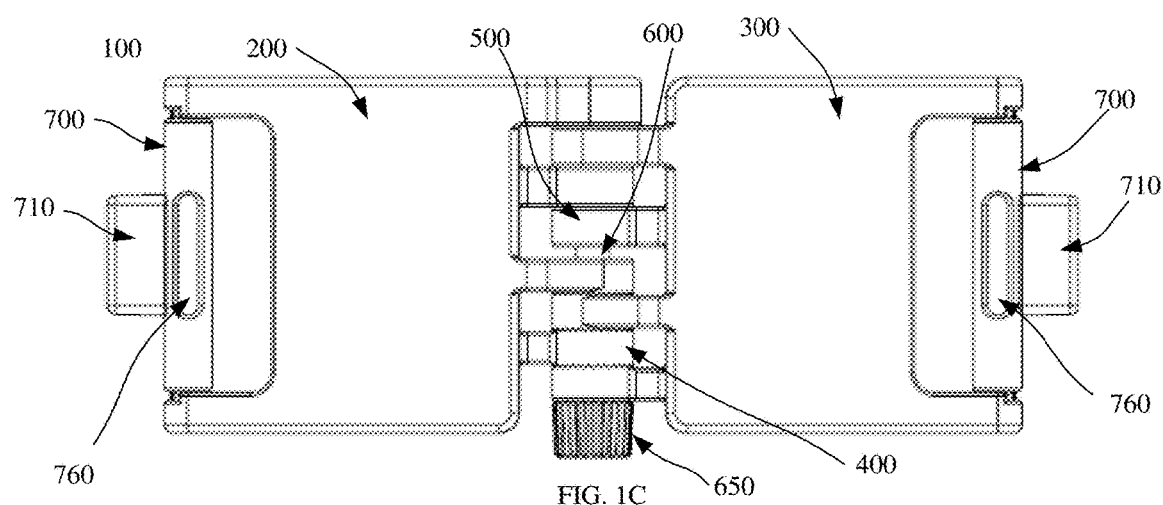
FIGS. 1C and 1D are schematic side views of the example building block according to an example embodiment of the present invention.

FIG. 1C is schematic top view of building block 100 in the first position. As shown in FIG. 1C, connecting pin 600 can extend through a portion of each panel element 200, 300, 400, and 500, and connecting nut 650 can be releasably attached to one end of connecting pin 600, for example by a threaded connection (see, e.g., FIG. 6A described below). Connectors 700 can include connecting notches 760. The notches 760 can be through holes through one side of a respective connector 700 to and through an opposite side of the respective connector 700, thereby forming two receptacles in which to receive a respective connecting projection of a respective other panel element, or can be a longitudinal groove in a respective side of the respective connector 700. A respective notch 760 can be formed on each of one, two, or three sides of a respective connector, with a connecting projection 710 being formed on the fourth side of the respective connector 700.

Figure 1D:
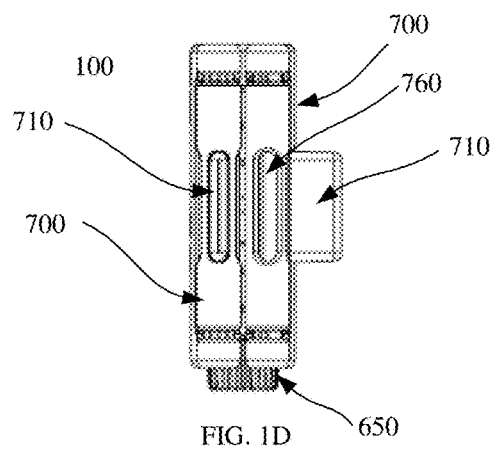

FIG. 1D is a schematic side view of building block 100 in the first position. As illustrated in FIG. 1D, connecting projections 710 can be rotated to a position approximately perpendicular to the respective panel element connecting projection 710 is connected or to a position approximately parallel to the respective panel element connecting projection 710 is connected.

Figure 1E:
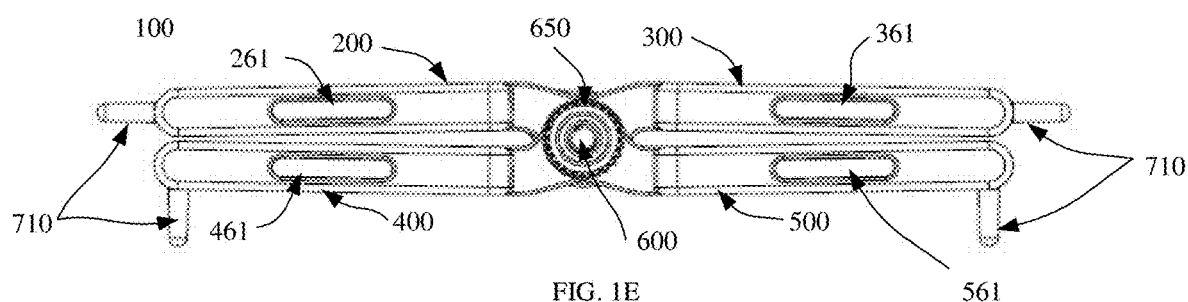
FIG. 1E is a schematic bottom view of the example building block according to an example embodiment of the present invention.

FIG. 1E is a schematic bottom view of building block 100 in the first position. In the first position, panel element 200 contacts panel element 400, and panel element 300 contacts panel element 500. In addition to top connecting notches 260, 360, 460, and 560, as shown in FIG. 1B, each panel element 200, 300, 400, and 500 can have bottom connecting notches 261, 361, 461, and 561.

Figure 2A:
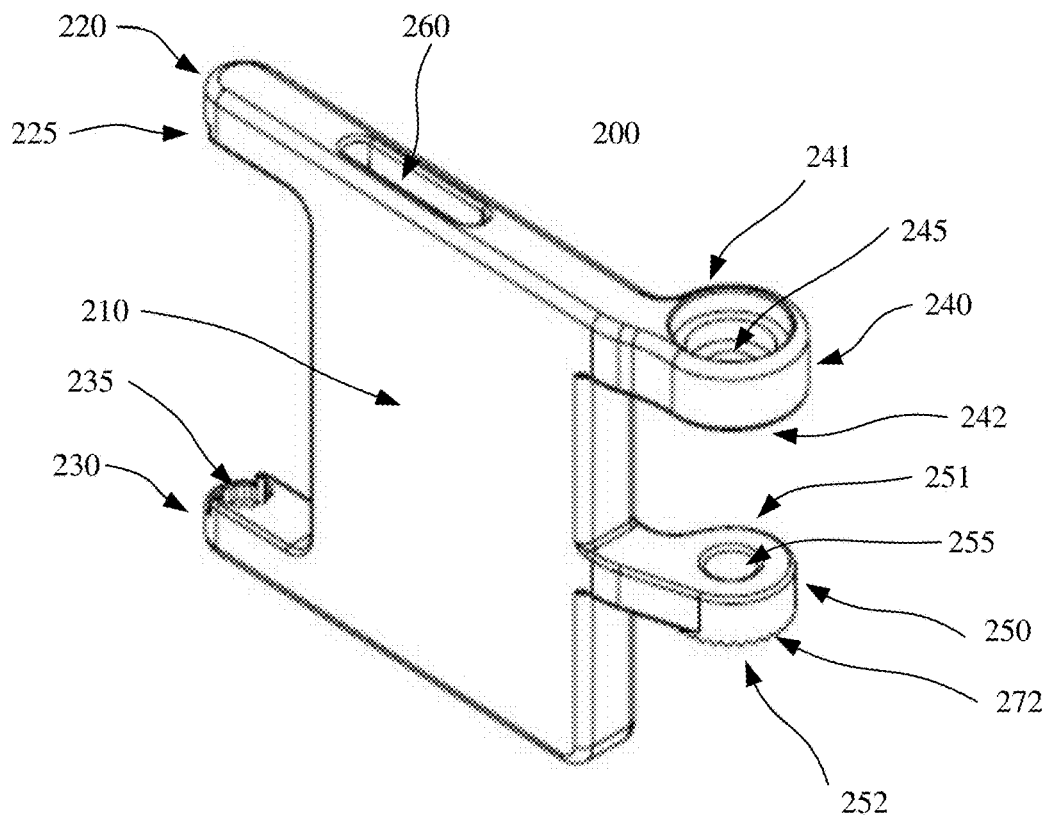
FIGS. 2A and 2B are perspective views of an example first panel element according to an example embodiment of the present invention.

FIG. 2A is a perspective view of panel element 200, disconnected from building block 100. Panel element 200 can include body 210. Top shoulder 220, bottom shoulder 230, and top connecting notch 260 can be formed on body 210, and top shoulder 220 and bottom shoulder 230 can be configured to receive connector 700. Top pin socket 240 and bottom pin socket 250 can be formed on body 210, and top pin socket 240 and bottom pin socket 250 can be configured to receive connecting pin 600 to allow panel 200 to rotate about connecting pin 600. Top pin socket 240 can include top surface 241, bottom surface 242, and through hole 245, through which connecting pin 600 can be positioned. Bottom pin socket 250 can include top surface 251, bottom surface 252, and through hole 255, through which connecting pin 600 can be positioned. Locking feature 272 can be formed on bottom surface 252.

As shown in FIG. 2A, bottom shoulder 230 can include bottom connector socket 235, which is formed in bottom shoulder 230 and configured to receive connector 700. Top shoulder 220 can include top connector socket 225, which is formed in top shoulder 220 and configured to receive connector 700.

Figure 2B:
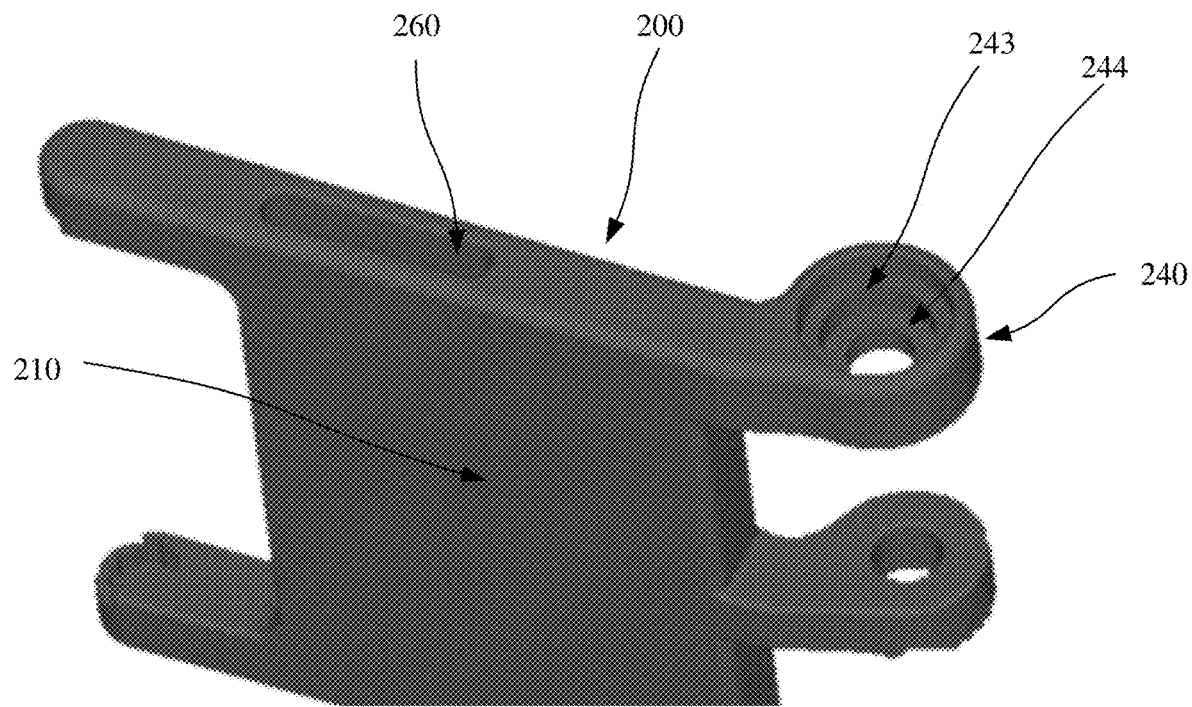

FIG. 2B is a perspective view of panel element 200, disconnected from building block 100. Panel element 200 can include body 210 in which connecting notch 260 is formed. As shown in FIG. 2B, top pin socket 240 can include first step 243 and second step 244, which are formed inside through hole 245 and project inwards towards the center of through hole 245. Step 243 and step 244 can be configured to correspond to a shape of head 601 of connecting pin 600, so that when connecting pin 600 is positioned in through hole 245, a top surface of head 601 of connecting pin 600 is flush with top surface 241 of top pin socket 240.

Figure 3:
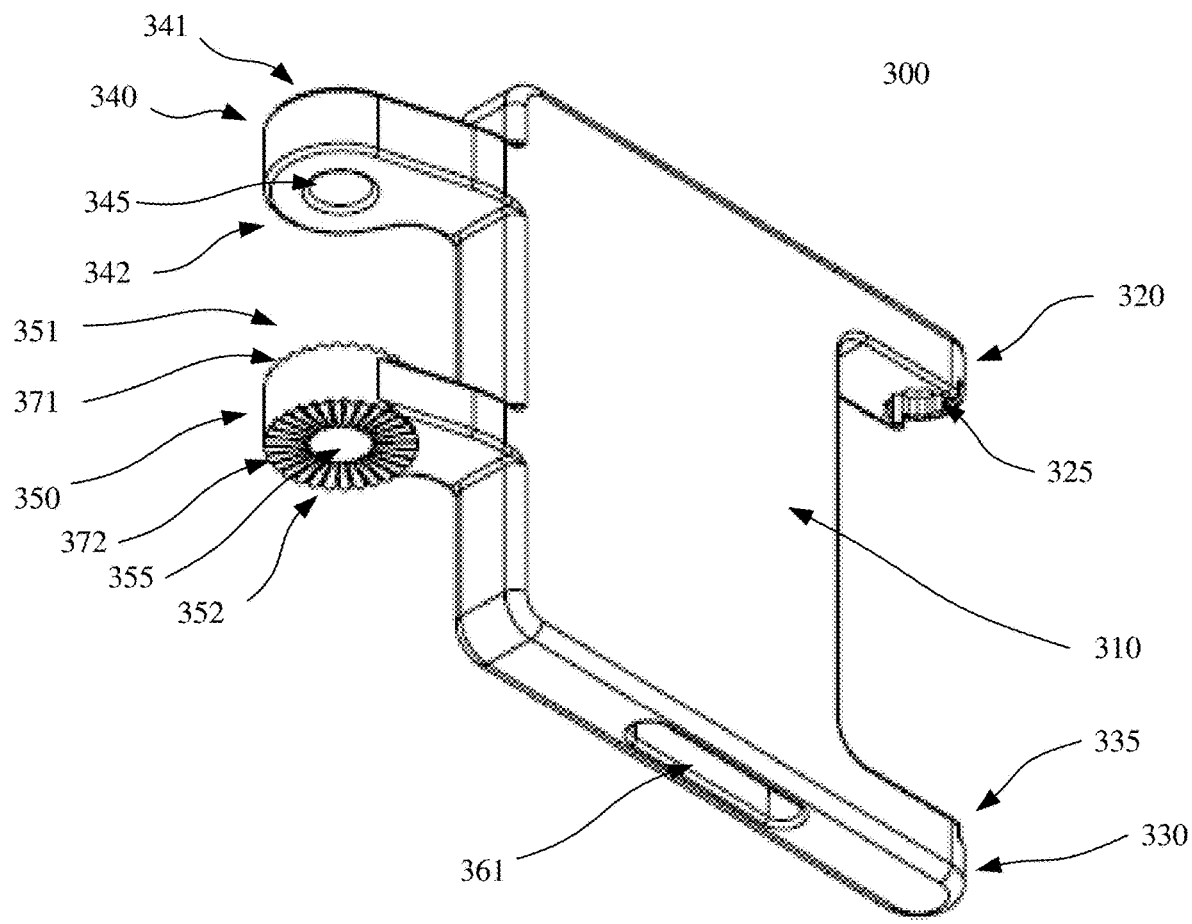
FIG. 3 is a perspective view of an example second panel element according to an example embodiment of the present invention.

FIG. 3 is a perspective view of panel element 300, disconnected from building block 100. Panel element 300 can include body 310. Top shoulder 320, bottom shoulder 330, and bottom connecting notch 361 can be formed on body 310, and top shoulder 320 and bottom shoulder 330 can be configured to receive connector 700. Top pin socket 340 and bottom pin socket 350 can also be formed on body 310, and top pin socket 340 and bottom pin socket 350 can be configured to receive pin 600 to allow panel 300 to rotate about connecting pin 600. Top pin socket 340 can include top surface 341, bottom surface 342, and through hole 345, through which connecting pin 600 can be positioned. Bottom pin socket 350 can include top surface 351, bottom surface 352, and through hole 355, through which connecting pin 600 can be positioned. Locking feature 371 can be formed on top surface 351, and locking feature 372 can be formed on bottom surface 352.

As shown in FIG. 3, bottom shoulder 330 can include bottom connector socket 335, which is formed in bottom shoulder 330 and configured to receive connector 700. Top shoulder 320 can include top connector socket 325, which is formed in top shoulder 320 and configured to receive connector 700.

Figure 4:
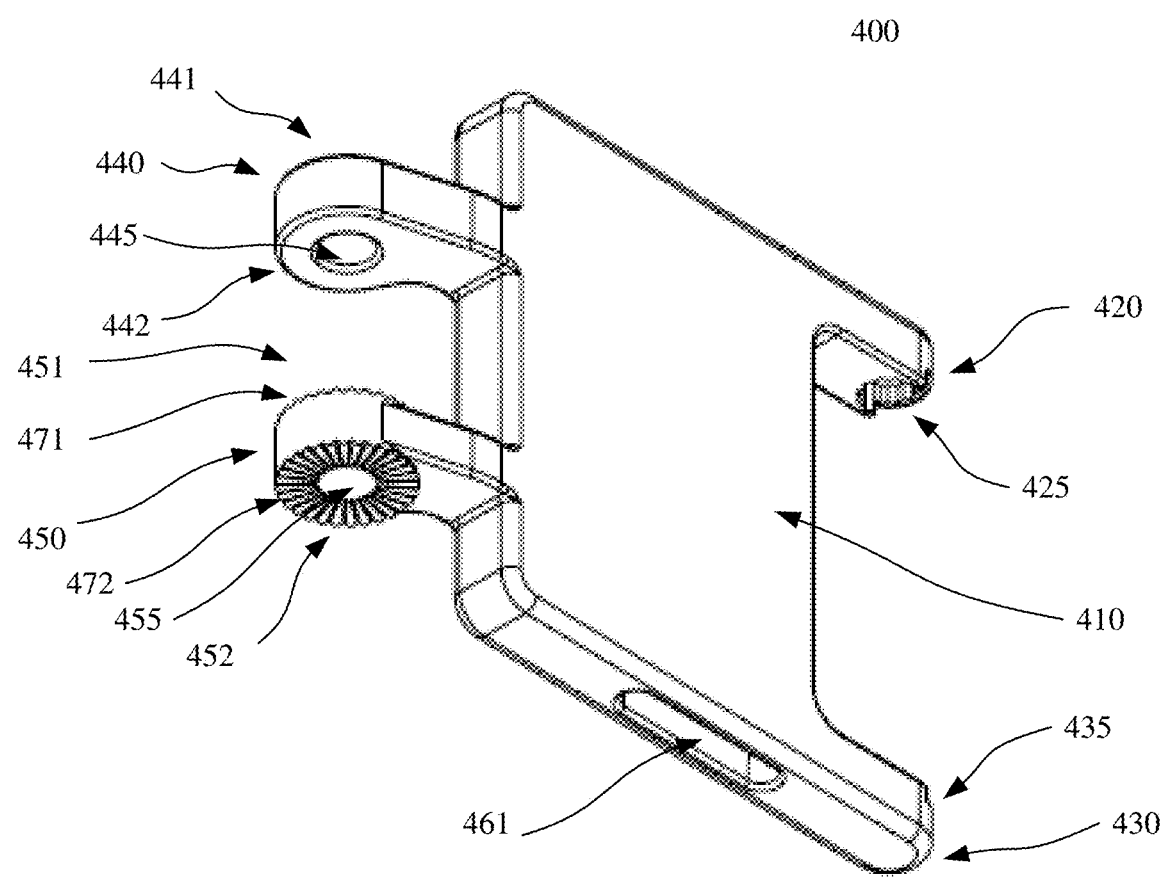
FIG. 4 is a perspective view of an example third panel element according to an example embodiment of the present invention.

FIG. 4 is a diagram of panel element 400, disconnected from building block 100. Panel element 400 can include body 410. Top shoulder 420, bottom shoulder 430, and bottom connecting notch 461 can be formed on body 410, and top shoulder 420 and bottom shoulder 430 can be configured to receive connector 700. Top pin socket 440 and bottom pin socket 450 can also be formed on body 410, and top pin socket 440 and bottom pin socket 450 can be configured to receive connecting pin 600 to allow panel 400 to rotate about connecting pin 600. Top pin socket 440 can include top surface 441, bottom surface 442, and through hole 445, through which connecting pin 600 can be positioned. Bottom pin socket 450 can include top surface 451, bottom surface 452, and through hole 455, through which connecting pin 600 can be positioned. Locking feature 471 can be formed on top surface 451, and locking feature 472 can be formed on bottom surface 452

As shown in FIG. 4, bottom shoulder 430 can include bottom connector socket 435, which is formed in bottom shoulder 430 and configured to receive connector 700. Top shoulder 420 can include top connector socket 425, which is formed in top shoulder 420 and configured to receive connector 700.

Figure 5A:
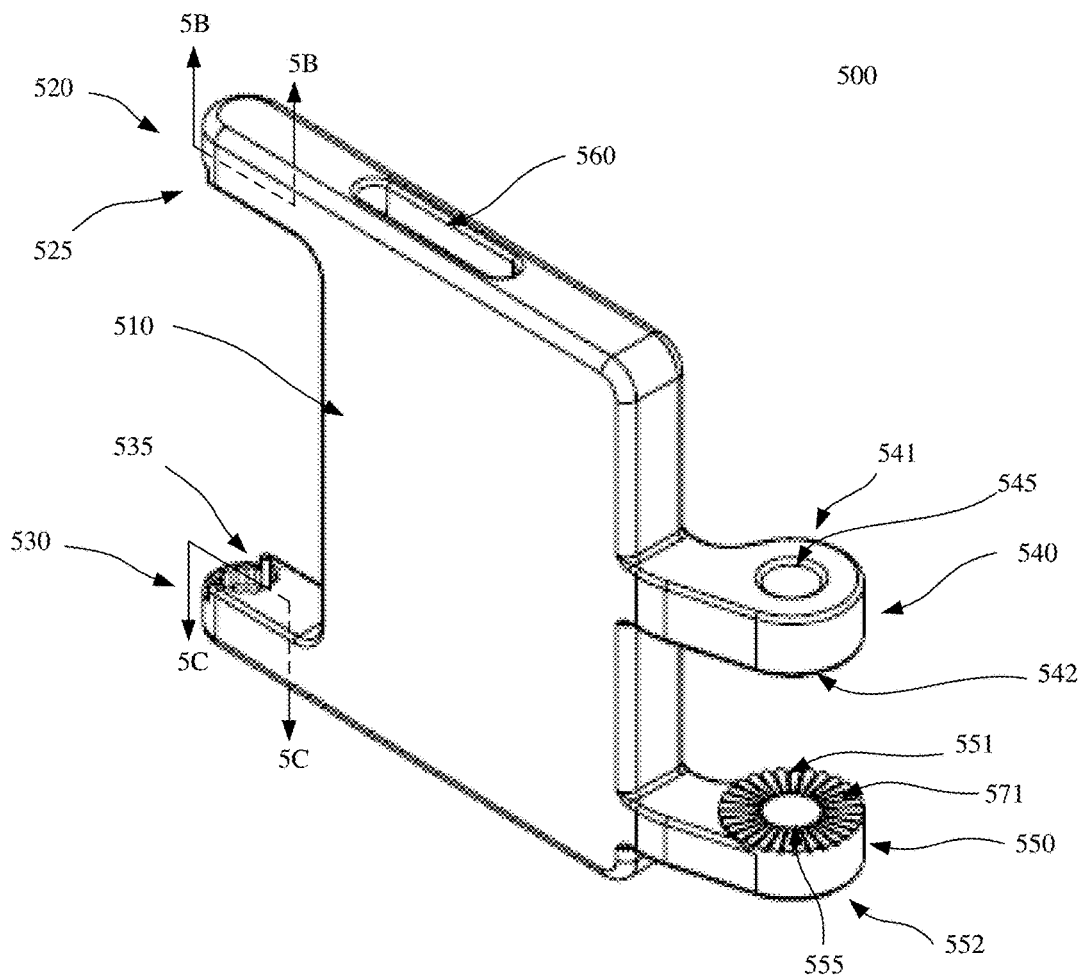
FIG. 5A is a perspective view of an example fourth panel element according to an example embodiment of the present invention.

FIG. 5A is a diagram of panel element 500, disconnected from building block 100. Panel element 500 can include body 510. Top shoulder 520, bottom shoulder 530, and top connecting notch 560 can be formed on body 510, and top shoulder 520 and bottom shoulder 530 can be configured to receive connector 700. Top pin socket 540 and bottom pin socket 550 can also be formed on body 510, and top pin socket 540 and bottom pin socket 550 can be configured to receive connecting pin 600 to allow panel 500 to rotate about connecting pin 600. Top pin socket 540 can include top surface 541, a bottom surface 542, and through hole 545, through which connecting pin 600 can be positioned. Bottom pin socket 550 can include top surface 551, bottom surface 552, and through hole 555, through which connecting pin 600 can be positioned. Locking feature 571 can be formed on top surface 551.

As shown in FIG. 5A, bottom shoulder 530 can include bottom connector socket 535, which is formed in bottom shoulder 530 and configured to receive connector 700. Top shoulder 520 can include top connector socket 525, which is formed in top shoulder 520 and configured to receive connector 700.

Figure 5B:
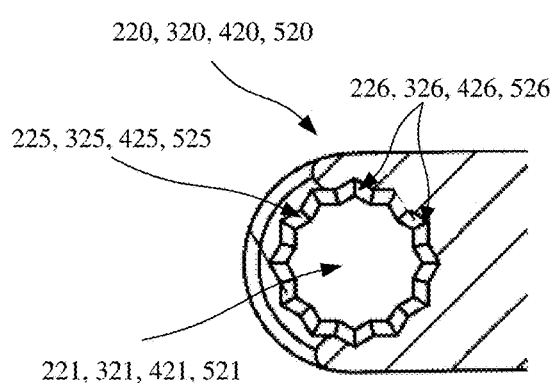
FIGS. 5B and 5C are detailed schematic sectional views of the example panel elements according to an example embodiment of the present invention.

FIG. 5B is a detailed sectional view of top shoulders 220, 320, 420, and 520. Each top shoulder 220, 320, 420, and 520 includes a respective top connector socket 225, 325, 425, and 525. Each top connector socket 225, 325, 425, and 525 includes a top receptacle 221, 321, 421, and 521 for receiving connector 700. Each top receptacle 221, 321, 421, and 521 can also include ridge elements 226, 326, 426, 526 positioned around the circumference of top receptacle 221, 321, 421, 521. Ridge elements 226, 326, 426, and 526 can be configured to engage and contact connector 700.

Figure 5C:
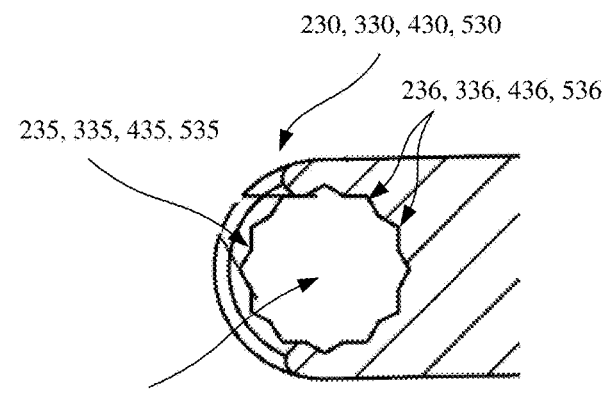

FIG. 5C is a detailed sectional view of bottom shoulders 230, 330, 430, and 530. Each bottom shoulder 230, 330, 430, and 530 includes a respective bottom connector socket 235, 335, 435, and 535. Each bottom connector socket 235, 335, 435, and 535 includes a bottom receptacle 231, 331, 431, and 531 for receiving connector 700. Bottom receptacle 231, 331, 431, and 531 can also include ridge elements 236, 336, 436, 536 that are positioned around the circumference of bottom receptacle 231, 331, 431, 531. Ridge elements 237, 327, 427, and 527 can be configured to engage and contact connector 700.

Figure 6A:
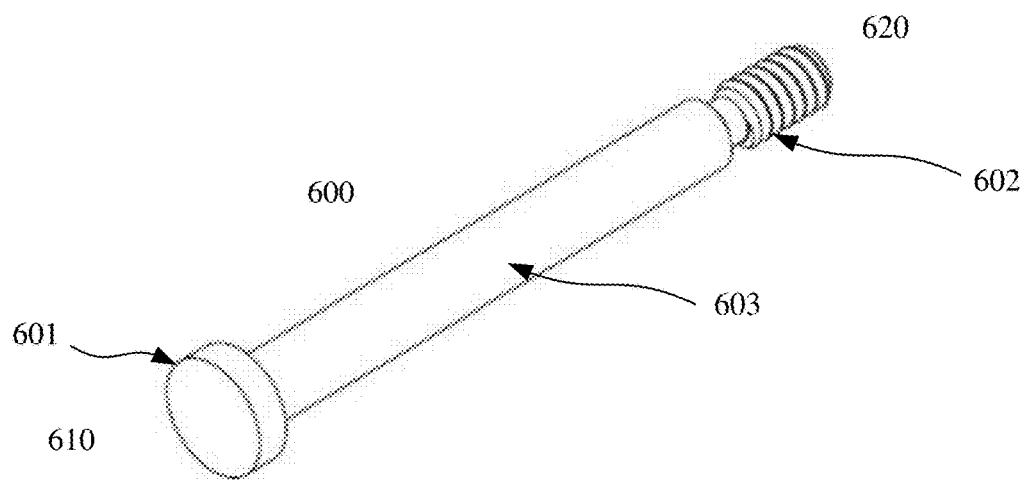
FIG. 6A is a perspective view of an example connecting pin according to an example embodiment of the present invention.

FIG. 6A is a diagram of connecting pin 600. Connecting pin 600 includes top end 610 and bottom end 620. Located at top end 610 of connecting pin 600 is head 601. Located at bottom end 620 of pin is thread portion 602, and located in between head 601 and thread portion 602 is shank portion 603. Head 601 can have a larger diameter than shank portion 603 and thread portion 602.

Figure 6B:
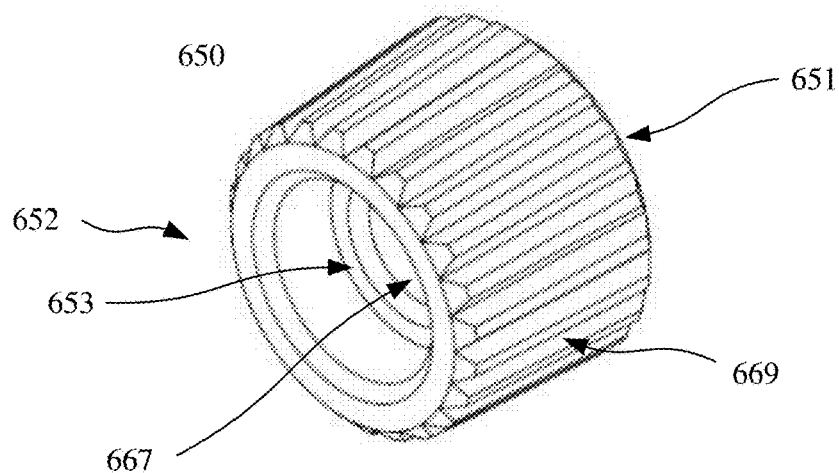
FIG. 6B is a perspective view of a connecting nut according to an example embodiment of the present invention.

FIG. 6B is a diagram of connecting nut 650. Connecting nut 650 is configured to releasably engage thread portion 602 of connecting pin 600 and can include top surface 651 and bottom surface 652. Connecting nut 650 can also include through hole 667 and step 653 which is formed inside through hole 667. Connecting nut 650 can also include ridges 669 formed on the outer surface of connecting nut 650. Ridges 669 can be utilized to assist in engaging and disengaging connecting nut 650 to and from thread portion 602 of connecting pin 600.

Figure 6C:
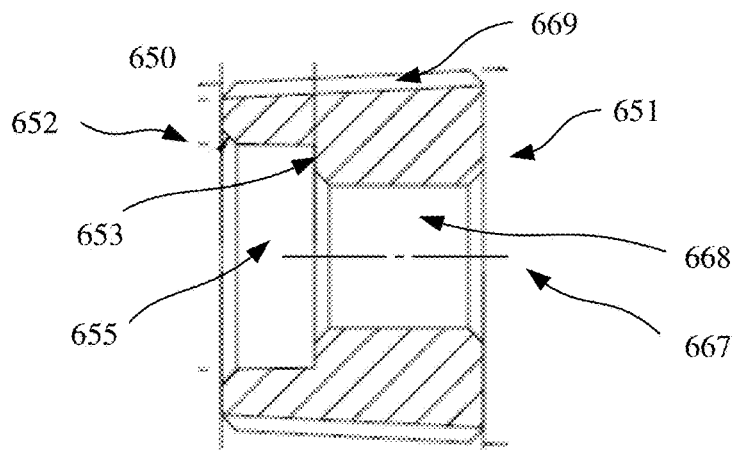
FIG. 6C is a schematic sectional view of the connecting nut according to an example embodiment.

FIG. 6C is a cross-sectional view of connecting nut 650. As shown in FIG. 6C, step 653 separates through hole 677 into two sections: first section 668 and second section 655. In this example embodiment, first section 668 has a smaller diameter than second section 655, and the transition between section 668 and 655 is delimited by step 653. Section 668 of through hole 677 can be configured to receive thread portion 602 of pin 600. For example, section 668 can be threaded to receive thread portion 602 of pin 600. In an example embodiment, pin 600 extends downward into connecting nut 650 at the top surface 651 of connecting nut 650, with threaded portion 602 of pin 600 threaded through section 668 of nut 650, with a bottom end of pin 600 extending into section 655 of nut. In a manufacturing method, with the bottom end of pin 600 in section 655, a process such as melting is performed to deform the bottom end of pin 600 to widen a tip of pin 600 at its bottom end, so that the widened tip abuts against step 653 when pin 600 is twisted to be threadably shifted in a direction away from nut 650 by a predetermined amount. In this way, pin 600 cannot be completely removed from nut 650, but rather only loosened.

Figure 7A:
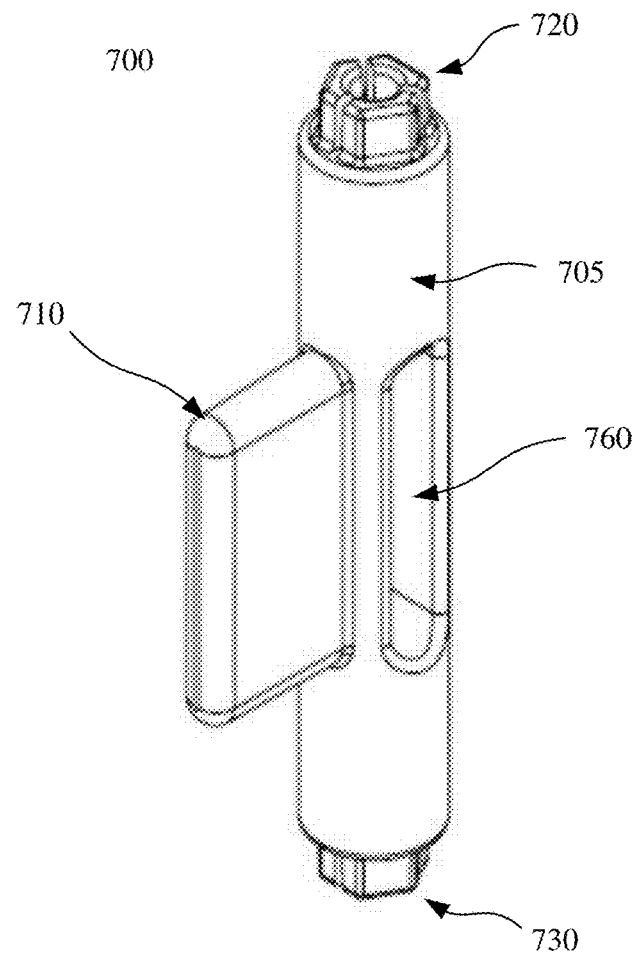
FIGS. 7A and 7B are perspective views of an example connector according to an example embodiment of the present invention.

FIG. 7A is a perspective view of connector 700. Connector 700 can include body portion 705, connecting notch 760, and connecting projection 710. Connecting projection 710 can be positioned on body 705 approximately orthogonal to connecting notch 760. Connector 700 can also include top projection 720 and bottom projection 730. Top projection 720 and bottom projection extend from body portion 705 of connector 700 and are configured to connect connector 700 to panel elements 200, 300, 400, and 500 via respective connector sockets 225, 235, 325, 335, 425, 435, 525, and 535 of panel elements 200, 300, 400, and 500.

Figure 7B:
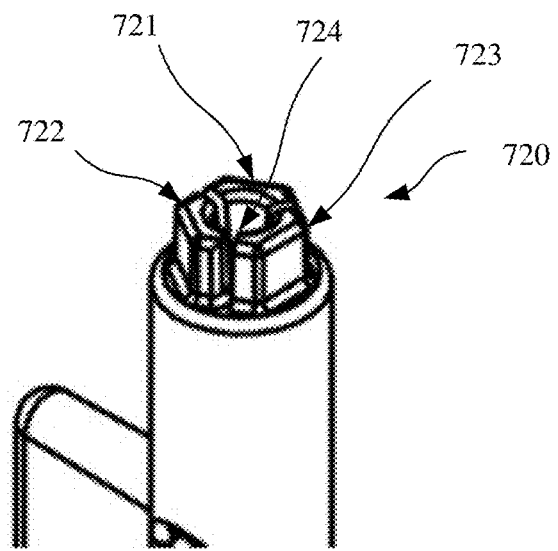

FIG. 7B is a detail of top projection 720. In the illustrated example embodiment, top projection 720 includes first projection element 721, second projection element 722, and third projection element 723, each projecting away from body portion 705 of connector 700. First, second, and third projection elements 721-723 in the illustrated example embodiment are separate projections and surround cavity 724. First, second, and third projection elements 721-723 are configured, for example, to contact ridge elements 226 of panel elements 200 to allow connector 700 to be rotated with respect to panel element 200. For example, the combination of projection elements 721-723 and ridge elements 226 of panel element 200 can form a detent so to enable connector 700 to rotate at discrete steps with respect to panel element 200. For example, as the connector 700 is rotated between resting positions in which vertices of the projection elements 721-723 lie in corresponding exterior vertices of the ridge element 226, the projection elements 721-723 are pressed radially inward by contact of the vertices of the projection elements 721-723 with interior vertices of the ridge element 226 allowing the rotation of the connector 700 by application of force sufficient to overcome the outward elastic bias of projection elements 721-723. In each resting position of the connector 700, a long side of each of the projection elements 721-723 extending between a respective pair of vertices of the respective projection element extends between a respective non-adjacent pair of the exterior vertices of the ridge element 226.

In an example embodiment, bottom projection 730 of connector 700 is configured in the same manner as top projection 720.

In an alternative example embodiment, instead of projection elements 721-723, projections 720 and 730 are formed as top and bottom balls that are rotatable in connector sockets 225, 235, 325, 335, 425, 435, 525, and 535, shaped as receiving domes, as shown for example in FIG. 15.

Figure 8A:
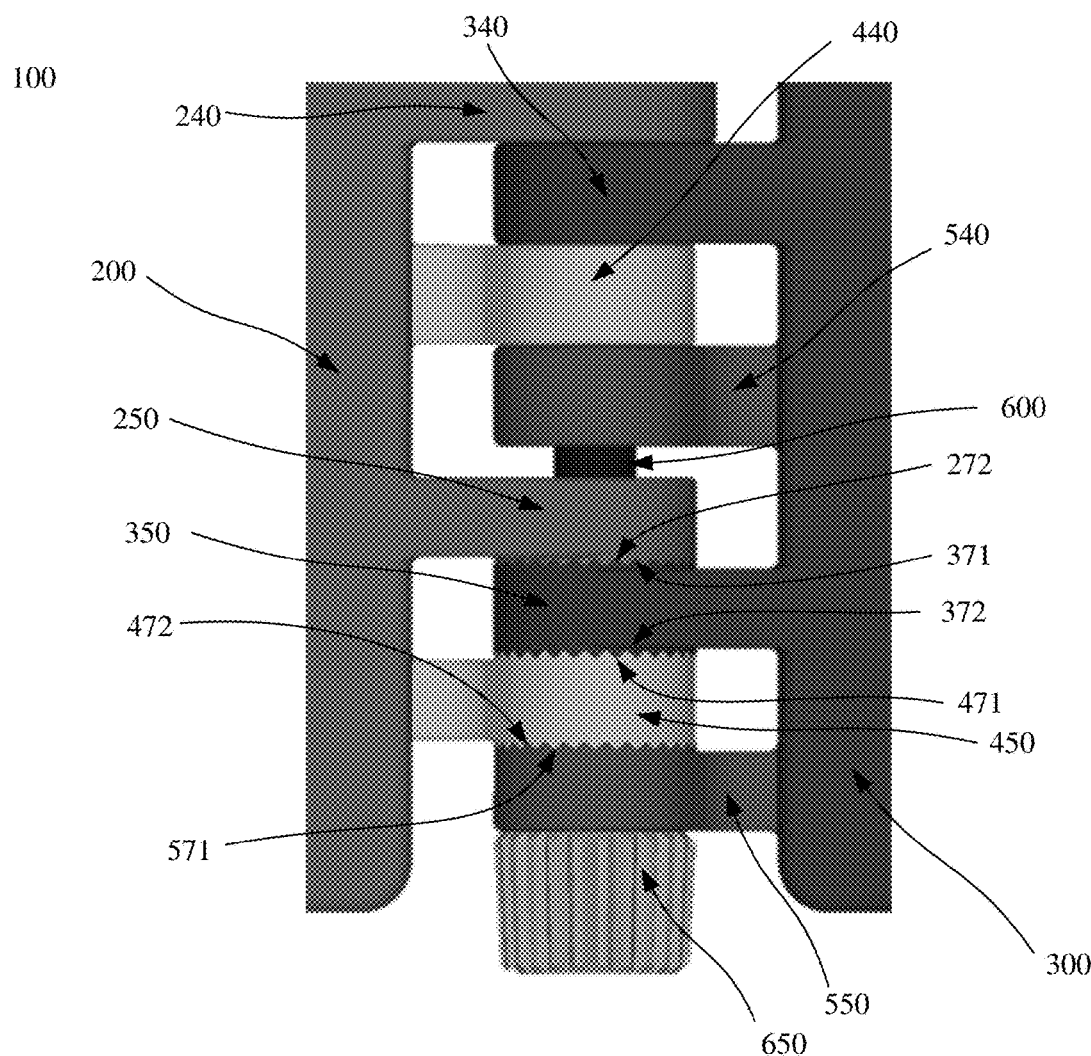
FIG. 8A is a schematic view of an example connection between the panel elements according to an example embodiment of the present invention.

FIG. 8A is a schematic view of a part of building block 100, illustrating locking features 272, 371, 372, 471, 472, and 571 of panel elements 200, 300, 400, and 500. As shown in FIG. 8A, panel elements 200, 300, 400, and 500 are rotatably connected to each other via connecting pin 600; top pin socket 240, 340, 440; and bottom pin socket 350, 450, and 550. When panel elements 200, 300, 400, and 500 are connected, locking element 272 engages with locking element 371 of panel element 300; locking element 372 engages with locking element 471; and locking element 472 engages with locking element 571. Locking elements 272, 371, 372, 471, 427, and 571 are configured to create a fixed connection between adjacent panel elements when tightened against each other by the tightening of nut 650 on pin 600, while at the same time enabling panel elements 200, 300, 400, and 500 to rotate relative to each other about connecting pin 600 when the nut 650 is loosened.

In an example embodiment, each pair of contacting locking elements, i.e., 272/371; 372/471; and 472/571 is configured with a plurality of separate detents so that panel elements 200, 300, 400, and 500 can rotate at discrete steps with respect to each other when loosened. The detents are sloped allowing the mating locking elements to maintain contact with each other as the panel elements are rotated, allowing an easy rotation with just minimal loosening of nut 650.

Figure 8B:
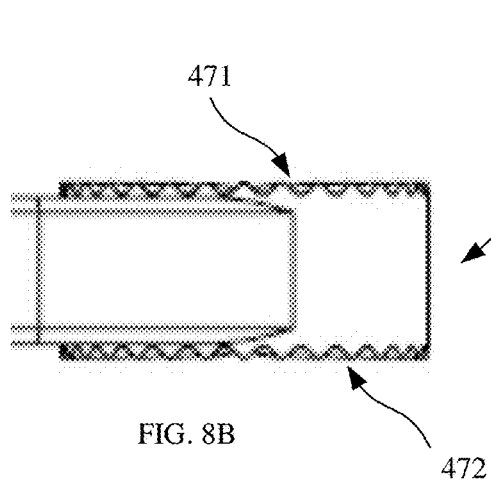
FIGS. 8B and 8C are detailed schematic views of an example pin socket and locking elements according to an example embodiment of the present invention.

FIG. 8B is a detailed schematic view of bottom pin socket 450, illustrating locking elements 471 and 472 formed on top surface 451 and bottom surface 452, respectively, of bottom pin socket 500.

Figure 8C:
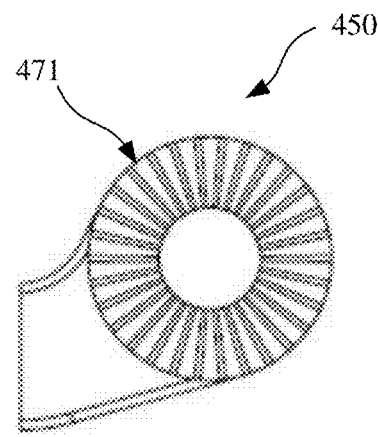

FIG. 8C is a detailed schematic top view of top pin socket 450, illustrating surface 451 and locking element 471. Locking element 471 can be formed as a series of projections around the annular top surface 451 and can correspond to locking element 372, with which locking element 471 engages and is in contact when panel elements 300 and 400 are rotated with respect to each other.

Figure 9:
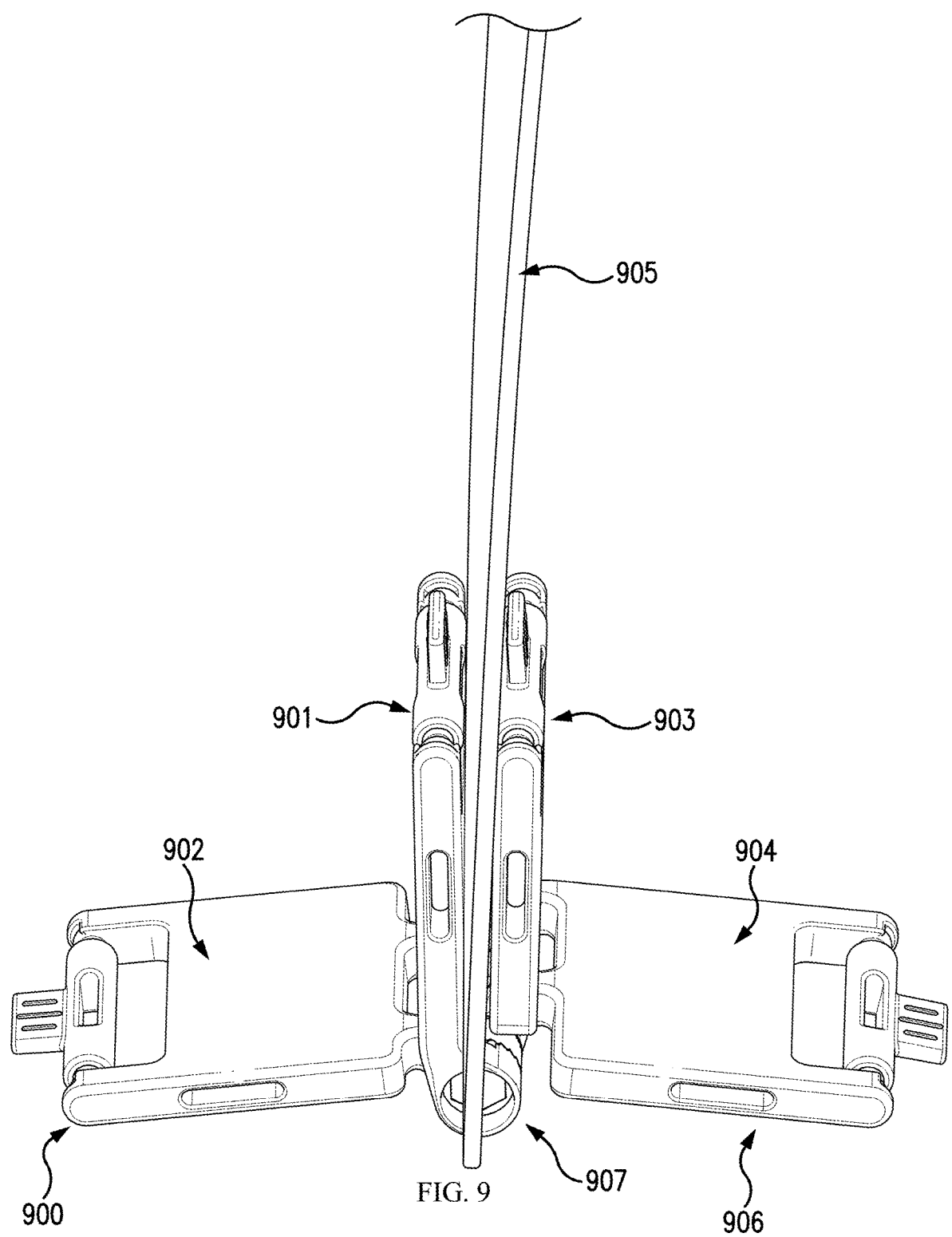
FIG. 9 depicts an example use of the building block according to an example embodiment of the present invention.

FIG. 9 depicts an example method of using building block 900 (which does not necessarily include all of the features described above with respect to FIGS. 1A-8C). Building block 900 can be used as a clamp to clamp object 905. To use building block 900 as a clamp, connecting nut 907 can be loosened to allow panel elements 901, 902, 903, and 904 to rotate into their respective positions. For example, panel elements 902 and 904 can be rotated until panel elements 902 and 904 are approximately parallel to each other and rest on surface 906, so as to form a base for building block 900. Panel elements 901 and 903 can then be rotated towards each other, so as to exert a clamping force on object 905. Once panel elements 901, 902, 903, and 904 are in their respective positions, connecting nut 907 can be tightened so as to lock panel elements 901, 902, 903, and 904 into fixed positions.

Figure 10:
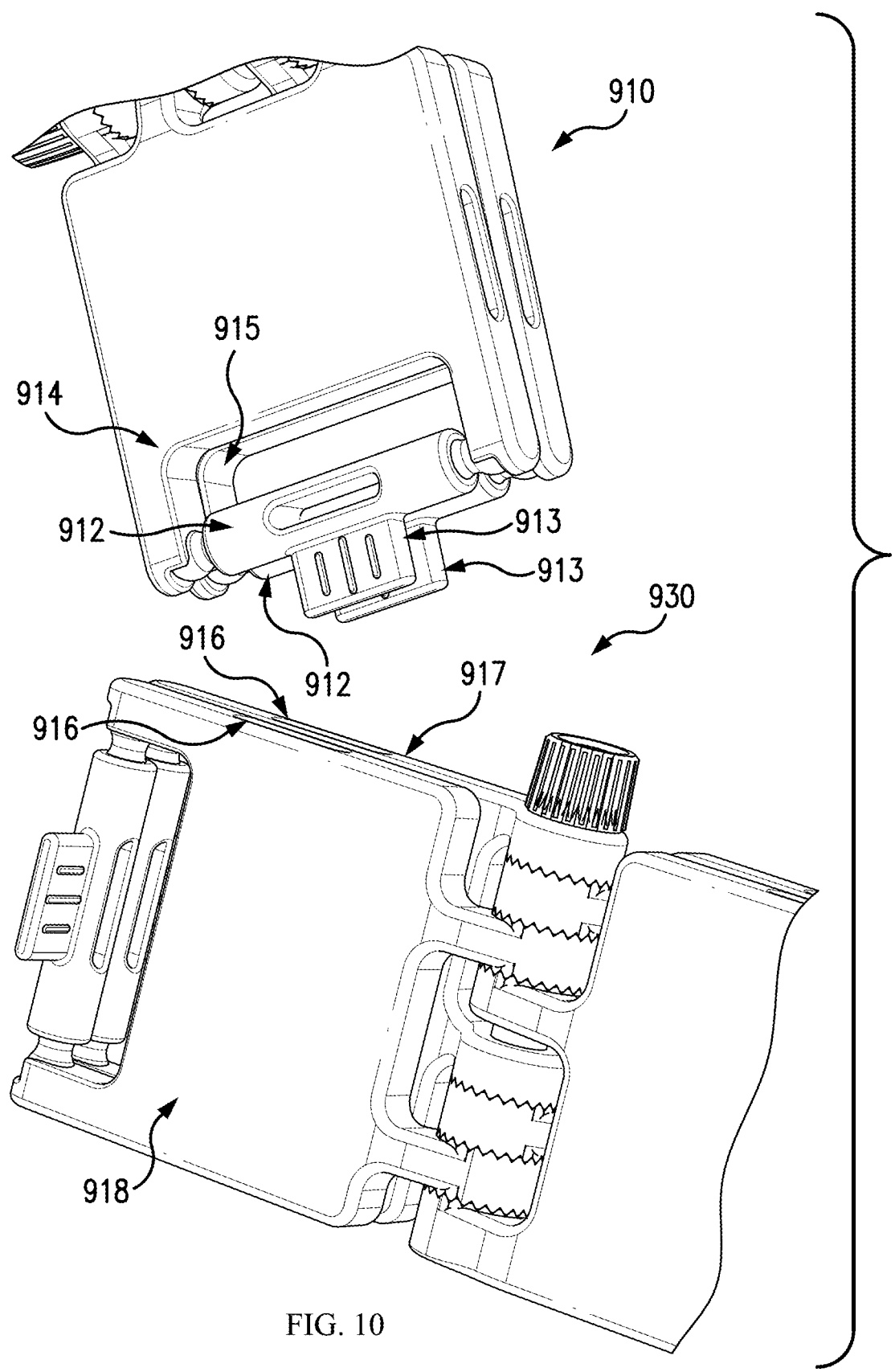
FIG. 10 depicts an example use of the building block according to an example embodiment of the present invention.

FIG. 10 depicts an example method of connecting building blocks 910 and 930. Building block 910 can have connecting projection 913, which project from connectors 912, each connector 912 being rotatably connected to panel elements 914 and 915. Building block 930 can have connecting notches 916 formed in panel elements 917 and 918. As shown in FIG. 10, building block 910 can be positioned relative to building block 930 so as to align connecting projection 913 with connecting notches 916.

Figure 11:
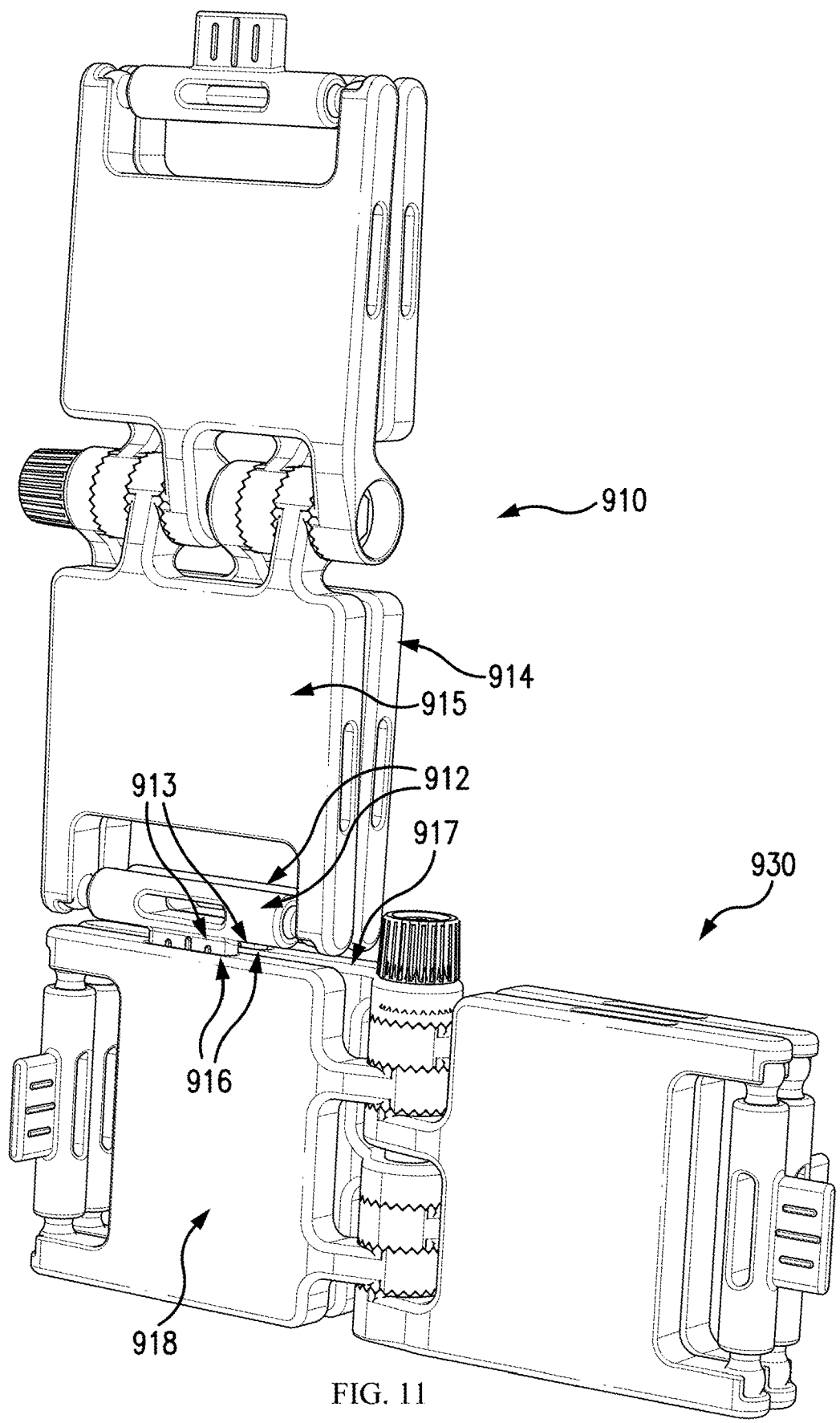
FIG. 11 depicts an example use of the building block according to an example embodiment of the present invention.

FIG. 11 depicts two building blocks 910, 930 connected to each other via a mechanical connection between connecting projection 913 and connecting notches 916. For example, connecting projection 913 of building block 910 can be pushed into connecting notches 916 until a mechanical connection is made between connecting projection 913 and connecting notches 916.

Figure 12:
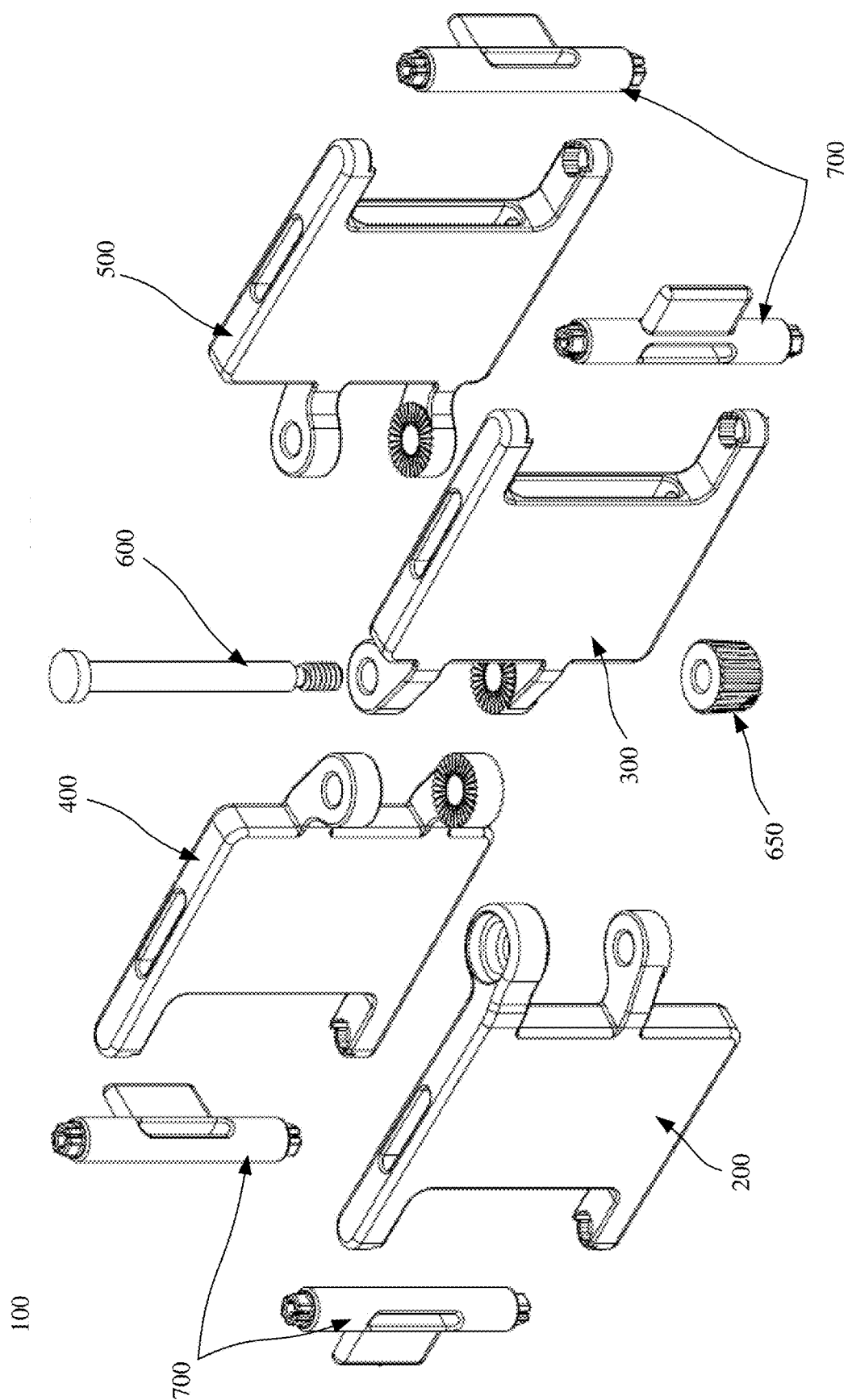
FIG. 12 is a perspective view of an example building block.

FIG. 12 depicts a perspective exploded view of components, 200, 300, 400, 500, 600, 650, and 700 of building block 100.

As shown in FIGS. 2A, 3, 4, and 5A, the pin sockets 240/250, 340/350, 440/450, and 540/550 include through holes 245, 255, 345, 355, 445, 455, 545, 555 connected to respective bodies 210, 310, 410, 510 by respective connecting arms. The connecting arms are bent so that the centers of the through holes 245, 255, 345, 355, 445, 455, 545, 555 are laterally offset from the respective bodies 210, 310, 410, 510, in that a straight line from respective ones of the through holes 245, 255, 345, 355, 445, 455, 545, 555 to a center of the thickness of the respective bodies 210, 310, 410, 510 forms an oblique angle with a direction of radial extension of the bodies 210, 310, 410, 510 from the pin 600. Further, the bending of the connecting arms is such that the spiral radially outward from the pin 600, the spiraling direction alternating between connecting arms of adjacent panel elements 200, 300, 400, and 500. For example, with respect to a perspective by which nut 650 is at the bottom and pin head 601 is at top, the connecting arms of panel element 200 spirals outward from the pin 600 in a clockwise direction, the connecting arms of panel element 300 spirals outward from the pin 600 in a counter-clockwise direction, the connecting arms of panel element 400 spirals outward from the pin 600 in a clockwise direction, and the connecting arms of panel element 500 spirals outward from the pin 600 in a counter-clockwise direction. In this way, the spiraling directions of the arms of each pair of adjacent ones of the panel elements are opposite to each other. This allows for use of the panel elements to form a base and also to form a clamp. Specifically, when the building block 100 is viewed in a direction facing towards the pin head 601, then, when a pair of adjacent panel elements are spread out, the pair of panel elements forms a base of approximately 180° if the pair used is such that the arms of the bottom panel element on the right spirals outward in a counter-clockwise direction and the arms of the bottom panel element on the left spirals outward in a clockwise direction; and, when a pair of adjacent panel elements are rotated towards each other, the pair of panel elements forms a strong clamp if the pair used is such that their arms spiral radially outward in directions towards each other.

Figure 13:
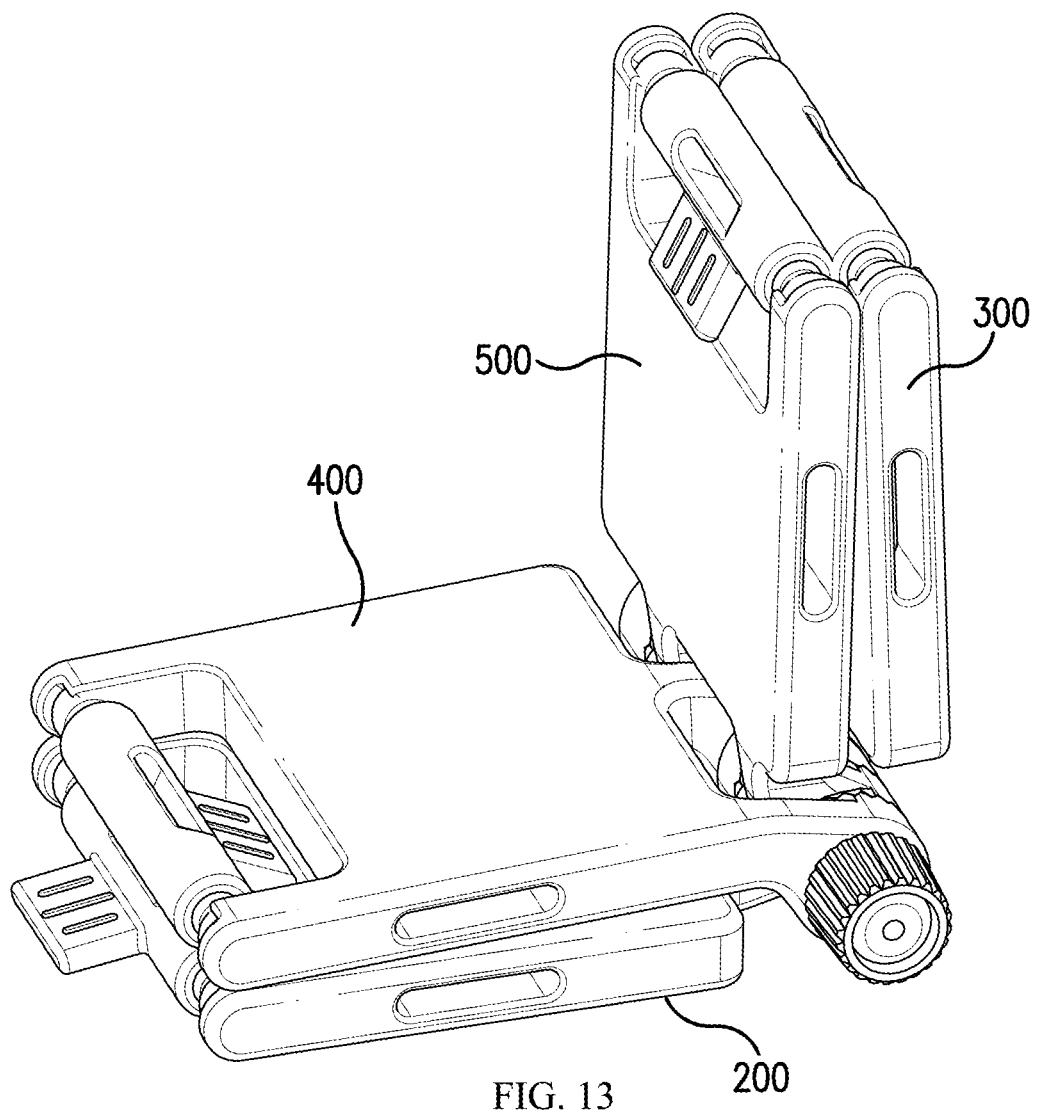
FIG. 13 illustrates a building block arranged as a corner block according to an example embodiment of the present invention.
Figure 14:
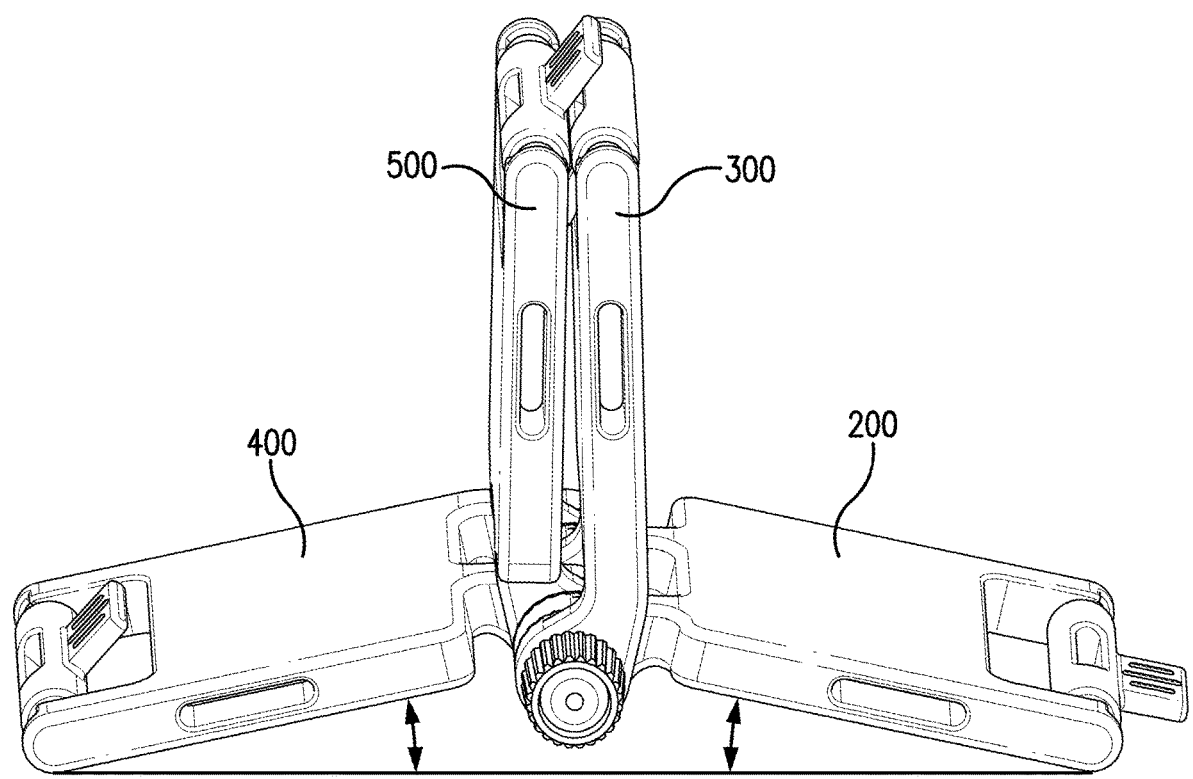
FIG. 14 illustrates a building block arranged as a base according to an example embodiment of the present invention.

Significantly, as shown in the figures, in an example embodiment, four panel elements are included in a building block 100, which allows for the panel elements to form two clamps and/or bases. In the illustrated example, if two of the panel elements are used to form a base of approximately 180°, then each of the panel elements used for the base also forms a part of a strong clamp with a respective one of the remaining two panel elements, but if the remaining two panel elements not forming the base are rotated away from the panel elements forming the base and towards each other to form a clamp, then the arms of the panel elements forming the clamp spiral outward away from each other. This, however, may be advantageous so that panel elements 200 and 400 can be rotated towards each other to a point where their radially exterior edges can abut against each other to form a clamp and so that panel elements 300 and 500 can be rotated towards each other to a point where their radially exterior edges can abut against each other to form a clamp, whereas if the arms of panel element 400 would rotate in the same direction as panel element 200, then body 410 would contact a radially interior edge of body 210 so that panel elements 200 and 400 could not be rotated towards each other as well, and similarly, if the arms of panel element 500 would rotate in the same direction as panel element 300, then body 310 would contact a radially interior edge of body 510 so that panel elements 500 and 300 could not be rotated towards each other as well. Additionally, this embodiment is advantageous because it allows for the building block 100 to be manipulated into a corner block as shown in FIG. 13, where one the panel elements have been rotated so that one of panel elements 200 and 300 forms a base and the other of panel elements 200 and 300 forms a wall, as outer planes of a corner, while panel elements 400 and 500 form inner planes of the corner. Although not shown, the panel elements can be rotated oppositely, so that panel elements 400 and 500 form the base and exterior corner wall and panel elements 200 and 300 form inner planes of the corner. Moreover, even according to this embodiment, as shown in FIG. 14, panel elements 200 and 400 can form a base, while panel elements 300 and 500 form a strong clamp extending perpendicularly upward from the base formed by panel elements 200 and 400. However, as shown in FIG. 14, due to panel elements 200 and 400 spiraling out towards each other, the base formed by the panel elements is not a 180° base, but rather each of panel elements 200 and 400 is angled slightly downward from the pin 600 towards an underlying support on which the formed base is supported. (Similarly, panel elements 300 and 500 can be rotated to form the base, while panel elements 200 and 400 are rotated to extend perpendicularly upward from the base to form a strong clamp.)

However, according to an alternative example embodiment (not shown), the arms of a first pair of adjacent panel elements spiral outward in a clockwise direction and the arms of a second other pair of adjacent panel elements spiral outward in a counter-clockwise direction, so that one of the panel elements of the first pair and an adjacent panel element that is of the second pair can form a base of approximately 180° and the remaining panel elements can form a strong clamp with their arms spiraling radially outwards towards each other, for example with reversal of the spiraling directions of panel elements 400 and 500. However, formation of corner structures may be difficult using a structure according to those embodiment.

According to a hybrid embodiment, different blocks 100 are provided that can connect to each other as discussed above, where the panel elements of one or more of the blocks 100 are arranged to spiral out from the center pin 600 in the manner shown, for example, in FIGS. 13 and 14, with each pair of adjacent panel elements spiraling outward in opposite directions, while formed, and the panel elements of one or more others of the blocks 100 are arranged so that a first pair of adjacent panel elements spiral outward in a clockwise direction and a second other pair of adjacent panel elements spiral outward in a counter-clockwise direction. In this way, some of the blocks 100 can be used as corner blocks, and others can be used to form flush bases.

In an example embodiment, as shown in the figures, each of the panel elements includes two pin sockets connected by arms to main bodies of the panel elements, with one of the pin sockets including one or two locking features, and the other not including a locking feature. For example, in an example embodiment the bottom ones of the pin sockets of all of the panel elements includes one or two locking features (the bottom-most of all of the pin sockets of all of the panel elements only locks to a pin socket of another panel element above, and therefore the bottom surface can be provided without a locking profile, while the top surface can be provided with a locking profile to lock to a locking profile of a bottom surface of a pin socket above, and similarly a top-most of the bottom pin socket of all of the panel elements only locks to a pin socket of another panel element below, and therefore the top surface can be provided without a locking profile, while the bottom surface can be provided with a locking profile to lock to a locking profile of a top surface of a pin socket below, while the bottom pin sockets of the remaining panel elements can including locking profiles on both the upper and lower surfaces of the respective pin sockets in order to lock to pin sockets above and below). On the other hand, according to this example embodiment, as shown in the figures, the top pin sockets of each of the panel elements does not include a locking profile. This can be advantageous because the provision of locking profiles on both pin sockets of the panel elements can make it difficult to maneuver the panel elements between different relative rotational positions and can make locking more difficult. Nevertheless, despite only the bottom pin sockets including the locking profiles, the top pin sockets are also provided for increased stability, reducing torsional forces of the panel elements in response to forces applied parallel to the extension of the pin. In an alternative example embodiment, the locking profiles are provided only on the top pin sockets and not the bottom pin sockets. In yet another example embodiment, the locking profile is provided on both the top and bottom pin sockets for a more secure lock, but, as noted, this can make maneuverability more difficult.

The described example embodiments are understood to be embodiments of the invention that are applicable to all aspects of the invention, including compositions and methods.

The above specification and examples provide a description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements can be omitted or combined as a unitary structure, and/or connections can be substituted. Further, where appropriate, aspects of any of the examples described above can be combined with aspects of any of the other examples described to form further examples having comparable or different properties and/or functions, and addressing the same or different problems. Similarly, it will be understood that the benefits and advantages described above can relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

The invention claimed is:

1. A method of using a plurality of building blocks, the method comprising:
    positioning a first building block adjacent to a second building block; and
    applying a force to the first building block to mechanically connect the first building block to the second building block;
    wherein:
        each of the first and second building blocks includes:
            a plurality of panel elements, each of the plurality of panel elements being rotatable relative to each other one of the plurality of panel elements;
            a connecting pin that passes through each one of the plurality of panel elements and rotatably connects the plurality of panel elements to one another; and
            a plurality of connectors, each of the plurality of connectors being rotatably attached to a respective one of the plurality of panel elements;
        each one of the plurality of panel elements includes at least one locking feature configured to create a fixed connection between the plurality of panel elements; and
        each of the plurality of connectors of the first building block includes:
            at least one connecting projection; and
            at least one connecting notch by which the first building block is mechanically connectible with at least one connecting projection of the second building block.

2. The method according to claim 1, wherein each one of the plurality of panel elements of the first building block includes a top connecting notch and a bottom connecting notch, the top and bottom connecting notches each being mechanically connectible with at least one connecting projection of the second building block.

3. The method according to claim 2, wherein each one of the plurality of panel elements of the second building block includes a top connecting notch and a bottom connecting notch, the top and bottom connecting notches of the second building block each being mechanically connectible with the at least one connecting projection of the first building block.

4. The method according to claim 1, wherein each one of the plurality of panel elements of the first building block includes a top connecting notch and a bottom connecting notch, the top and bottom connecting notches each being configured to receive one of at least one connecting projection of the second building block.

5. The method according to claim 4, wherein each one of the plurality of panel elements of the second building block includes a top connecting notch and a bottom connecting notch, the top and bottom connecting notches of the second building block each being configured to receive one of the at least one connecting projection of the first building block.

6. The method according to claim 1, wherein the mechanical connectability of the at least one connecting notch with the at least one connecting projection of the second building block is by receipt of one of the at least one connecting projection of the second building block into a respective one of the at least one connecting notch of the first building block.

7. The method according to claim 6, wherein each of the at least one connecting projection of the second building block which the at least one connecting notch is configured to receive is structured like each of the at least one connecting projection of the connectors of the first building block.

8. The method according to claim 1, wherein each of the at least one connecting projection of the second building block with which the at least one connecting notch is mechanically connectible is structured like each of the at least one connecting projection of the connectors of the first building block.

9. The method according to claim 1, wherein the application of the force causes one of the at least one connecting notch to receive one of the at least one connecting projection of the second building block.

10. The method according to claim 1, wherein the application of the force causes one of the at least one connecting projections of the first building block to be received by a connecting notch of the second building block that is structured like each of one or more of the at least one connecting notch of the first building block.

* * * * *